United States Patent [19]
Colak

[11] Patent Number: 5,046,803
[45] Date of Patent: Sep. 10, 1991

[54] ACTIVELY PHASED MATCHED FREQUENCY DOUBLING OPTICAL WAVEGUIDE

[75] Inventor: Sel B. Colak, Ossining, N.Y.

[73] Assignee: North American Philips Corp., New York, N.Y.

[21] Appl. No.: 448,032

[22] Filed: Dec. 8, 1989

[51] Int. Cl.[5] .............................................. G02B 6/10
[52] U.S. Cl. .................................. 385/122; 385/130; 359/328
[58] Field of Search .......................... 350/96.14, 96.34

[56] References Cited

U.S. PATENT DOCUMENTS 4,427,260  1/1984  Puech et al. ..................... 350/96.14

FOREIGN PATENT DOCUMENTS 1594387  7/1981  United Kingdom.

OTHER PUBLICATIONS

"Second Harmonic Generation in Composite Waveguides" F. Zernike, Meeting on Integrated Optics, Jan. 12–14, 1976, Salt Lake City, Utah.
"Electric Field Tuning of Second-Harmonic Generation in a Three-Three-Dimensional Optical Waveguide" Appl. Phys. Lett. 34(1) Jan. 1, 1979.

Primary Examiner—William L. Sikes
Assistant Examiner—Robert E. Wise
Attorney, Agent, or Firm—William L. Botjer

[57] ABSTRACT

An actively phase matched waveguide structure suitable for use as a frequency doubling device is described. The phase matching of the waveguide is controlled by application of a control voltage. The waveguide includes first and second non-linear optical layers of material having differing indexes of refraction forming a waveguide. Disposed on the surface of the waveguide is a layer of transparent semiconductor material disposed between two transparent electrodes. The index of refraction of the transparent semiconductor material varies with the potential applied to the electrode and thereby varies the phase matching of the waveguide as a whole.

9 Claims, 2 Drawing Sheets

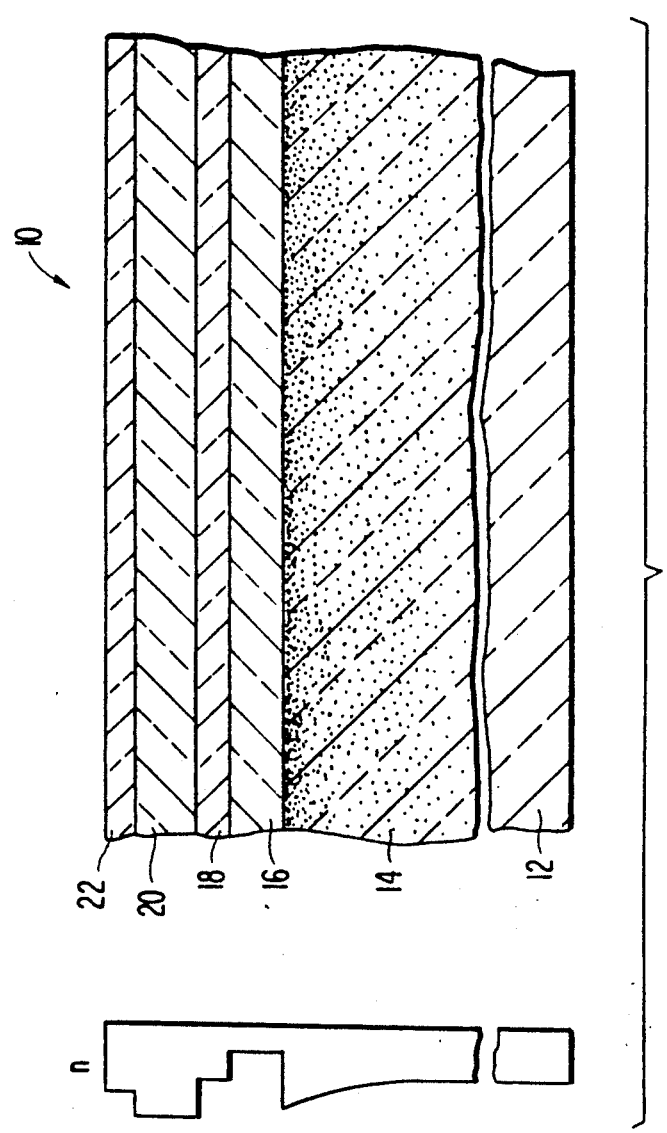

ACTIVELY PHASED MATCHED FREQUENCY DOUBLING OPTICAL WAVEGUIDE

BACKGROUND OF THE INVENTION

This invention relates to nonlinear optical devices and more particularly to devices for doubling the frequency of electromagnetic radiation passing therethrough.

Optical digital data storage devices, such as compact discs, have recently come into common usage. Typically, such discs are read and written to by means of a light emitted by a semiconductor laser (i.e. a laser diode). However, the light generated by semiconductor laser diodes generally falls within the lower end of the electromagnetic frequency spectrum (i.e. red or infrared). The use of higher frequency light, i.e. at the blue end of the spectrum, to read and write to optical storage medium would result in greatly increased storage density. Unfortunately, however, there are yet no practical blue semiconductor lasers. To date, the only blue lasers are large gas lasers which are obviously unsuitable for use in compact and inexpensive optical storage read/write devices.

Accordingly, a device capable of converting the light emitted by readily available semiconductor laser diodes to blue light is greatly desired. Laser diodes that emit infrared light are inexpensive and widely available. The frequency of blue light is twice that of infrared radiation. Accordingly, a device capable of doubling the frequency of infrared radiation has considerable commercial potential. The present invention is directed to providing an inexpensive frequency doubling device that may be used in conjunction with an infrared semiconductor laser to provide blue light suitable for use in reading and writing optical storage media.

The field of the non-linear optics has provided a number of devices used as frequency doublers, generally through the means of second harmonic generation (SHG) of a fundamental frequency. Such devices include bulk materials and stacks of non-linear crystals. A particularly effective doubling device is a non-linear optical waveguide. As a light beam passes through the waveguide the non-linear optical effect causes the generation of a lightwave of the second harmonic of the input lightwave. Such optical waveguides can be quite efficient in providing frequency doubling.

However, efficient frequency doubling requires accurate phase matching between the fundamental and harmonic waves. If the frequency doubling device is not properly phase matched interference effects will cause attenuation of the second harmonic. In a waveguide the tolerance requirements for accurate phase matching between the geometrical and physical properties of the waveguide are very difficult to achieve. A number of different structures have been proposed to provide phase matching. Phase matching has been attempted by both passive and active means. Passive phase matching has been accomplished by, for example, the addition of a periodic structure to a frequency doubling device. However, such devices are incapable of responding to changeable conditions and may lose accuracy over time. In contrast, the parameters of an active structure can be controlled in response to the measured output of the doubled light. Accordingly, it is desirable to be able to control the phase matching properties in an active manner. However, active phase matching devices have either been impractical or incapable of controlling the phase matching to a sufficient degree.

Proposals for active phase matching of the waveguide have been made in, for example, U.S. Pat. No. 4,427,260 (Puech et al) issued Jan. 24, 1984 and in the article "Electric Field Tuning of Second-Harmonic Generation in A Three-Dimensional LiNbO$_3$ Optical Waveguide", *Applied Physics Letters*, 34(1), Jan. 1, 1979. These proposals achieve phase matching by means of electro-optic tuning of the material forming the waveguide. However, these approaches are constrained by the fact that the index of refraction of the waveguide will undergo only relatively small changes by means of the electro-optic effect. Accordingly, such means are able to compensate for only relatively small changes in the geometrical or physical properties of the waveguide.

The present application is directed to overcoming the difficulties of the prior art. Specifically, the structure and methodology of the present invention is capable of achieving phase matching over a relatively wider range of geometric and physical changes to the waveguide.

SUMMARY OF THE INVENTION

The present invention is directed to providing an inexpensive device and method for doubling the frequency of electromagnetic radiation. Specifically, the structure utilizes active control of phase matching by an applied electric field. The applied electric field is applied across a semiconductor material which is disposed along a surface of a frequency doubling non-linear optical waveguide. The index of refraction of the semiconductor material is altered by the "Franz-Keldysh effect" in the presence of an applied electric field. The Franz-Keldysh effect is capable of modifying the index of refraction of the semiconductor layer to a relatively large degree. Accordingly, the phase matching of the waveguide structure as a whole is controllable to a greater degree than that of the prior art utilizing the electro-optic effect to control the index of refraction of the waveguide itself.

Specifically, the present invention is directed to a tunable waveguide structure which has a first waveguide constructed from first and second layers of non-linear optical material. The first and second layers have differing index of refraction and thus form a waveguide. Located on one surface of the waveguide structure is a semiconductor structure comprising first and second transparent electrodes disposed on either side of a transparent layer of semiconductor material. A voltage applied to the semiconductor layer by means of the electrode controls the index of refraction of the semiconductor layer and thus controls the phase matching of the waveguide as a whole.

As can be appreciated, a frequency doubling device constructed in accordance with the present invention is advantageous in that it is relatively easy to manufacture because the waveguide and semiconductor structure is not complex. Furthermore, since the phase matching is active the waveguide will frequency double over a wide range of environmental conditions. Accordingly, the device will operate efficiently in various environments and for relatively long periods of time.

BRIEF DESCRIPTION OF THE DRAWINGS

For a better understanding of the invention, references is made to the following drawings, to be taken in conjunction with the detailed specification to follow:

FIG. 2 is a section taken along line 2—2 of FIG. 1 with the indexes of refraction (n) of the various layers depicted alongside.

DETAILED DESCRIPTION OF THE PREFERRED EMBODIMENTS

Figure 1:
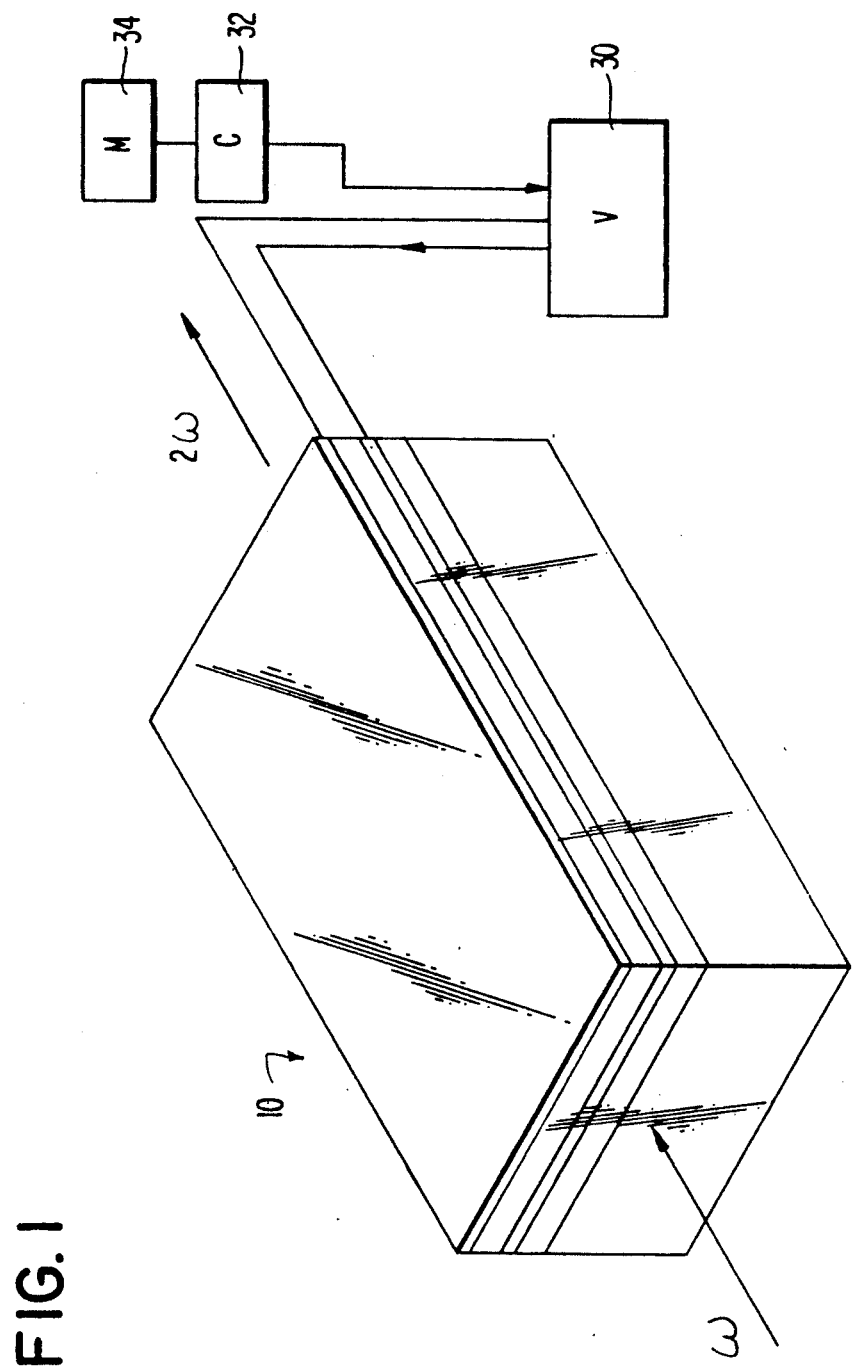
FIG. 1 is a perspective view of the waveguide structure utilizing active phase matching.

FIGS. 1 and 2 illustrate an embodiment of the inventive actively phased matched waveguide 10. The main body of the waveguide comprises a slab of non-linear optical material 12 such as by way of example only, potassium titanate phosphate ($KTiOPO_4$) known as "KTP". In a second layer 14, Thallium (T1) is incorporated into the KTP by diffusion or other techniques. The incorporation of thallium into KTP forms a frequency doubling waveguide since the thallium causes an increase in the index of refraction of the KTP (see the refractive index profile at FIG. 2), thus forming a non-linear optical waveguide capable of second harmonic generation.

Disposed on top of layer 14 is buffer layer 16 of insulating material such as silicon dioxide ($SiO_2$) which serves to separate the waveguide of layers 12 and 14 from the electrode and semiconductor layers disposed above. Disposed on top of buffer layer 16 is a first electrode layer 18 of a transparent conductor. Disposed on a layer 18 is a layer 20 of transparent semiconductor material whose index of refraction varies in accordance with an applied electrical field. Disposed above layer 20 is a second transparent conductive electrode 22, which with electrode 18 is used to apply an electrical field to semiconductor layer 20 to vary its index of refraction. Suitable material for the transparent electrodes 18, 22 is indium tin oxide (InSnO). Suitable semiconductor materials which have an index of refraction which varies in accordance with an applied electric field are II-VI materials such as Zinc Selenide (ZnSe). Glasses doped with II-VI particles are a possibility as well.

The structure of device 10 is such that a change in the index of refraction of semiconductor layer 20 effects the propagation of light through the waveguide as a whole. Thus, changes to the index of refraction of layer 20 by means of the field applied to layers 18, 22 controls the phase matching of the waveguide. Since the voltage applied between electrodes 18, 22 controls the index of refraction of layer 20 which in turn controls the phase matching of the entire device 10, control over phase matching is accomplished by varying the potential applied between electrodes 18 and 22. Accordingly, electrodes 18, 22 are connected to a variable voltage supply 30 the potential of which controls phase matching. Power supply 30 has a control input which in turn is connected to control circuitry 32 which has an input connected to a device 34 for detecting the intensity of light of the second harmonic of the input light. Depending on the intensity of the output light device 34 causes control circuit 32 to correct the output voltage of voltage supply 30 thus ensuring phase matching. The actual circuitry used in voltage supply 30 control 32 and light intensity meter 34 are well known to those skilled in the art and need not be described further.

The materials used in the above-described structure are not to be construed as limiting but merely exemplary. The above-described materials namely, a KTP and thallium doped KTP waveguide utilizing a zinc selenide semiconductor layer for phase matching control is suitable for use in the frequency doubling of infrared to blue light, which as described above, is important in the field of optical storage devices. However, other materials may be used for doubling in other frequency ranges. For example, the substrate could be comprised of lithium niobiate ($LiNbo_3$) and the semiconductor layer could be constructed from III-V materials. Furthermore, electrodes 18 and 22 and semiconductor 20 could be replaced by a P-I-N multi-quantum well structure which would provide enhanced changes in the index of refraction. Finally, the thallium doped KTP layer could be replaced by a second ZnSe layer (inactive in frequency doubling) which eliminates the need for KTP diffusion. However, overall efficiency is likely to be reduced.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What is claimed is:

1. A tunable waveguide structure comprising:
   a waveguide having first and second layers of non-linear optical material, said first and second layers having differing indexes of refraction;
   a transparent semiconductor layer disposed on one surface of said waveguide, said transparent semiconductor layer having an index of refraction which varies by the Franz-Keldysh effect in response to an applied electrical field; and
   means for applying an electrical field to said transparent semiconductor layer to vary the index of refraction of said semiconductor layer to thereby control the phase matching of the waveguide as a whole.

2. The waveguide structure as claimed in claim 1, wherein said means for applying a voltage comprise a transparent electrode disposed on each side of said semiconductor layer, said electrode being connected to a variable voltage source.

3. The waveguide structure as claimed in claim 2 further including a buffer layer disposed between said electrode and said waveguide.

4. The waveguide structure as claimed in claim 1, wherein said first layer comprises KTP.

5. The waveguide structure as claimed in claim 1, wherein said second layer comprises thallium doped KTP.

6. The waveguide structure as claimed in claim 1, wherein said semiconductor layer comprises ZnSe.

7. The waveguide structure as claimed in claim 1, wherein said electrodes comprise InSnO.

8. A method for actively phase matching a waveguide structure comprising the steps of:
   providing a waveguide having first and second layers of non-linear optical material, said first and second layers having differing indexes of refraction;
   disposing a transparent semiconductor layer on a surface of said waveguide, said transparent semiconductor layer having an index of refraction which varies by the Franz-Keldysh effect in response to an applied electrical field; and
   applying a voltage to said semiconductor layer to the index of refraction of said semiconductor layer to control the phase matching of the waveguide as a whole.

9. A method as claimed in claim 8, wherein said means for applying a voltage comprise a transparent electrode disposed on each side of said semiconductor layer, said electrode being connected to a voltage source.

* * * * *